A. B. Mercier,
Washing Machine.
No. 4,227. Reissued Jan. 3. 1871.
Fig. 1.
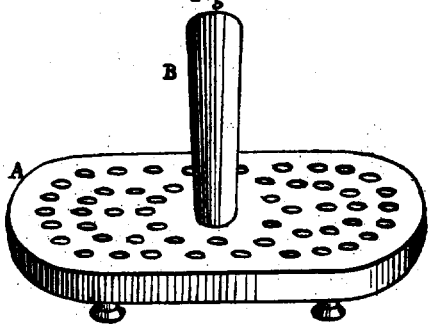
Fig. 2.
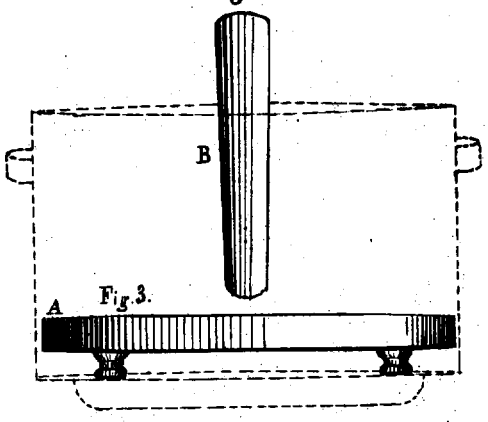
Fig. 3.
Fig. 4.
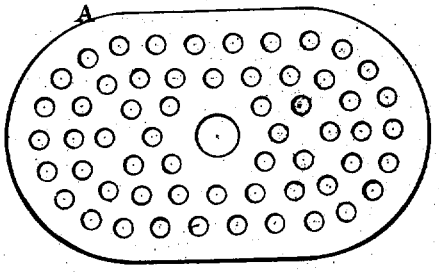
Witnesses, Chas L. Spencer
Sarah A. Athlon
Aristide B. Mercier Inventor.
N. PETERS, PHOTO-LITHOGRAPHER, WASHINGTON, D. C.

UNITED STATES PATENT OFFICE.

ARIADNA B. MERCIER, OF PROVIDENCE, RHODE ISLAND.

IMPROVEMENT IN CLOTHES-WASHERS.

Specification forming part of Letters Patent No. 56,773, dated July 31, 1866; Reissue No. 4,227, dated January 3, 1871.

*To all whom it may concern:*

Be it known that I, ARIADNA B. MERCIER, of Providence, in the county of Providence and State of Rhode Island, have invented a new and useful Improvement in Clothes-Washers; and I do hereby declare that the following is a full, clear, and exact description of the same, reference being had to the accompanying drawing, forming a part of this specification, in which—

Figure 1 is a perspective view. Figs. 2, 3, and 4 are parts of my invention.

My invention resides in the employment of a device, in combination with a wash-boiler of any ordinary construction, whereby a constant jet of scalding water is enabled to rise through a hollow shaft or chimney, connected with a body of water covering the bottom of the boiler, as the effect of the boiling process, and pour itself over the top of the clothes to be washed, so as to aid mechanically in scouring the clothes by the action of a rapidly-moving current.

In my opinion, the most convenient and economical way of applying my invention is shown in the accompanying drawing.

A, Figs. 1 and 4, is a plate of wood or metal made to fit easily in a clothes-boiler of any shape. This plate is perforated with small holes, having one large hole in the center. (See Fig. 4.) This hole is provided with a stopper, B, Figs. 1 and 2, which is simply a long wooden plug, which, when inserted in the central hole, will extend in the boiler above the level of the clothes, so as to be within convenient reach when it is desired to remove the same.

On the under side of plate A are four legs, for the purpose of keeping it a suitable distance from the bottom of a clothes-boiler, when in use, as shown by dotted lines on Figs. 2 and 3, whereby a space unobstructed by clothes is left for a body of water at the bottom of the boiler.

To give effect to my invention, the perforated plate or false bottom A should be placed in the boiler set over a fire, as shown at Fig. 3, the outline of the boiler being represented by dotted lines.

The clothes to be washed may then be packed around the stopper or plug B, and should naturally be so placed that when the plug B is withdrawn a chimney or hollow shaft will exist in its place.

The proper quantity of water and soap having been supplied to the boiler, the boiling operation is commenced and the plug B is withdrawn.

The effect consequent upon ebullition is to force from the body of water below the false bottom A a scalding jet of soap and water through the hollow shaft created by the removal of the plug B, which, falling upon the top of the clothes, permeates them and drains through the smaller orifices in the false bottom back into the water-space below, thus combining the rinsing effect of a running stream with the boiling operation.

By the use of my invention clothes can be washed without rubbing them, and in one-quarter the time usually required, and with better effect.

The fabric of the clothing is also saved from injury, as it is not necessary to use a wash-board in connection with my invention.

With my invention, after one hour's boiling the clothes are fit to be put into the last rinsing-water, preparatory to being wrung out and dried.

What I claim as my invention, and desire to secure by Letters Patent, is—

An improved apparatus for washing clothes in an ordinary boiler, consisting of a perforated false bottom, A, for the clothes to rest upon, a water-space formed underneath the said false bottom, and a plug, B, or equivalent device for forming a hollow shaft through the mass of clothes to connect with such water-space, and enable a jet of water to rise from the effect of ebullition and be poured over the top of the clothes, substantially as herein described.

ARIADNA B. MERCIER.

Witnesses:
BENJ. F. THURSTON,
FRANK G. ALLEN.